(12) United States Patent <br>
Leng et al.

(10) Patent No.: US 12,647,616 B2 <br>
(45) Date of Patent: Jun. 2, 2026

(54) STREAMING NEURAL NETWORK VIDEO CODEC SYSTEM AND METHOD

(71) Applicant: Cisco Technology, Inc., San Jose, CA (US)

(72) Inventors: Mengjun Leng, San Jose, CA (US); Samer Lutfi Hijazi, San Jose, CA (US); Rafal Pilarczyk, Plock (PL); Radhakrishna Shri Venkata Achanta, Vallorbe (CH)

(73) Assignee: CISCO TECHNOLOGY, INC., San Jose, CA (US)

( * ) Notice: Subject to any disclaimer, the term of this patent is extended or adjusted under 35 U.S.C. 154(b) by 18 days.

(21) Appl. No.: 18/637,613

(22) Filed: Apr. 17, 2024

(65) Prior Publication Data

US 2025/0330647 A1 Oct. 23, 2025

(51) Int. Cl.
| | |
|---|---|
| *H04N 19/65* | (2014.01) |
| *H04N 19/169* | (2014.01) |
| *H04N 19/172* | (2014.01) |

(52) U.S. Cl.
CPC ........... *H04N 19/65* (2014.11); *H04N 19/172* (2014.11); *H04N 19/1887* (2014.11)

(58) Field of Classification Search
CPC ... H04N 19/65; H04N 19/172; H04N 19/1887
See application file for complete search history.

(56) References Cited

U.S. PATENT DOCUMENTS

| | | | |
|---|---|---|---|
| 7,400,681 | B2 | 7/2008 | Joch et al. |
| 8,331,454 | B2 | 12/2012 | Bjøntegaard et al. |
| 8,576,914 | B2 | 11/2013 | Bjøntegaard et al. |
| 9,332,278 | B2 | 5/2016 | Bjøntegaard et al. |
| 10,070,142 | B2 | 9/2018 | Davies |
| 10,110,926 | B2 | 10/2018 | Midtskogen |
| 10,136,155 | B2 | 11/2018 | Fuldseth et al. |
| 10,217,466 | B2 | 2/2019 | Davies et al. |
| 10,419,785 | B2 | 9/2019 | Davies |
| 10,721,284 | B2 | 7/2020 | Davies |
| 10,986,374 | B2 | 4/2021 | Fuldseth et al. |
| 2015/0264371 | A1 | 9/2015 | Milstein |
| 2021/0168405 | A1 | 6/2021 | Hsiao et al. |
| 2023/0262259 | A1 | 8/2023 | Liang et al. |
| 2023/0336754 | A1 | 10/2023 | Habibian et al. |
| 2024/0007637 | A1 | 1/2024 | Ma et al. |

OTHER PUBLICATIONS

Mentzer F., et al., "VCT: A Video Compression Transformer," 36th Conference on Neural Information Processing Systems (NeurIPS 2022), https://arxiv.org/pdf/2206.07307, Oct. 12, 2022, 19 pages.

*Primary Examiner* — Kyle M Lotfi

(74) *Attorney, Agent, or Firm* — Edell, Shapiro & Finnan, LLC

(57) ABSTRACT

A streaming neural network video codec that leverages temporal redundancy, processing video frames in a rolling window fashion. By encoding video frames using information from multiple frames and only transmitting essential codewords, the system ensures efficient compression with reduced computational overhead. Resiliency to lost codewords is achieved by training with random masks on one or more codewords so that the decoder is robust to packet losses. These techniques achieved improved compression efficiency and significantly reduces the average operations required per frame, allowing for real-time, high-quality video streaming.

20 Claims, 11 Drawing Sheets

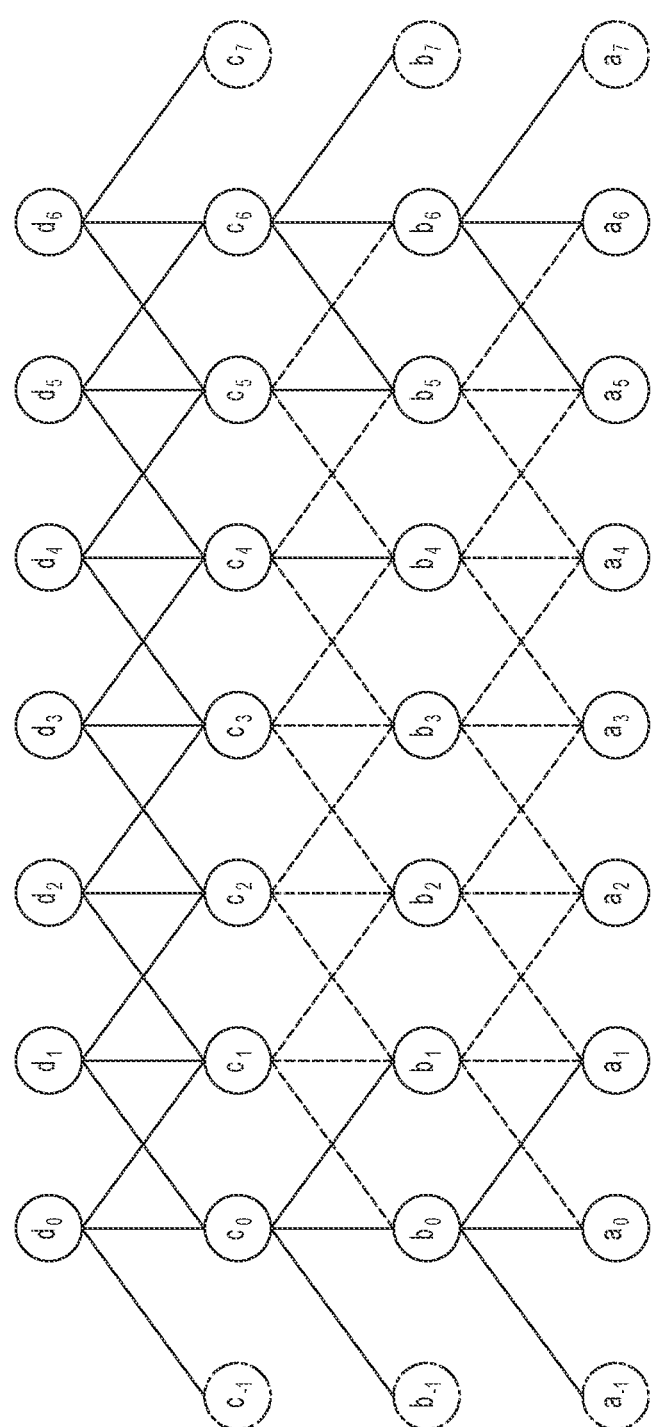
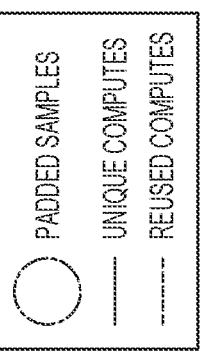
FIG.3

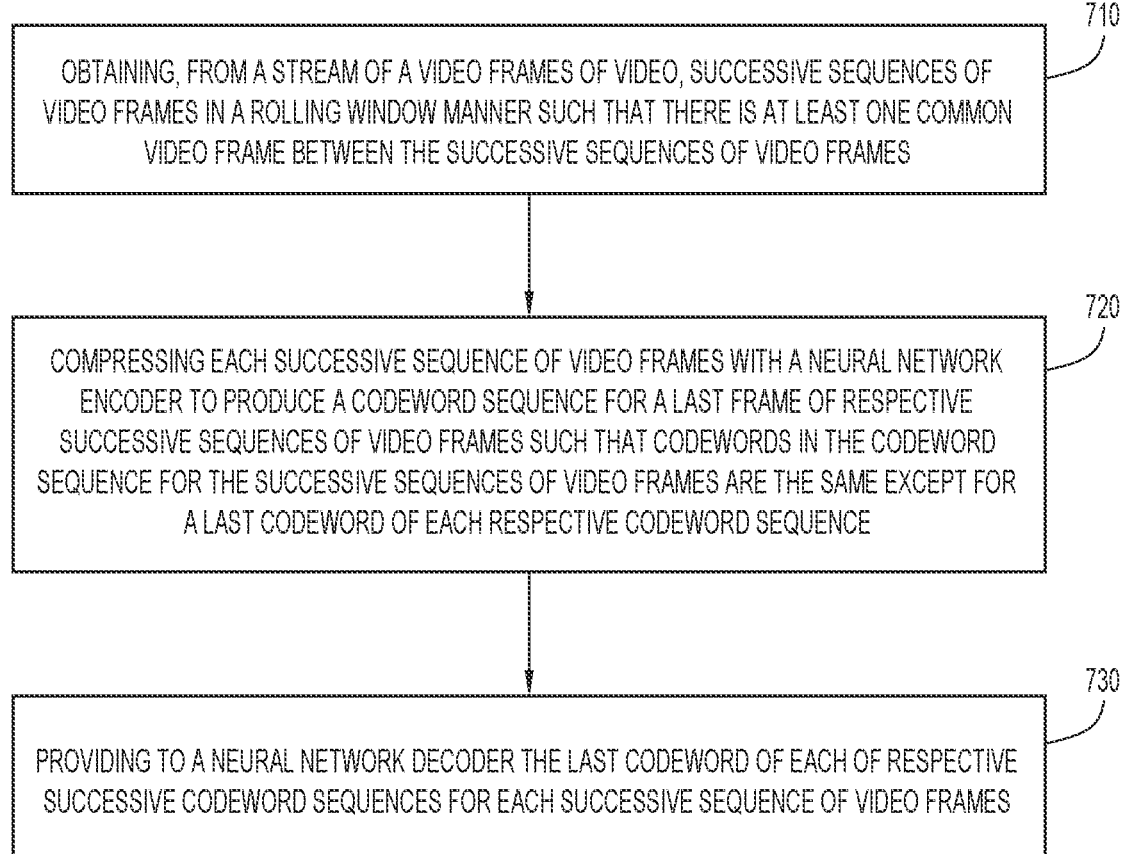

700

710

OBTAINING, FROM A STREAM OF A VIDEO FRAMES OF VIDEO, SUCCESSIVE SEQUENCES OF VIDEO FRAMES IN A ROLLING WINDOW MANNER SUCH THAT THERE IS AT LEAST ONE COMMON VIDEO FRAME BETWEEN THE SUCCESSIVE SEQUENCES OF VIDEO FRAMES

720

COMPRESSING EACH SUCCESSIVE SEQUENCE OF VIDEO FRAMES WITH A NEURAL NETWORK ENCODER TO PRODUCE A CODEWORD SEQUENCE FOR A LAST FRAME OF RESPECTIVE SUCCESSIVE SEQUENCES OF VIDEO FRAMES SUCH THAT CODEWORDS IN THE CODEWORD SEQUENCE FOR THE SUCCESSIVE SEQUENCES OF VIDEO FRAMES ARE THE SAME EXCEPT FOR A LAST CODEWORD OF EACH RESPECTIVE CODEWORD SEQUENCE

730

PROVIDING TO A NEURAL NETWORK DECODER THE LAST CODEWORD OF EACH OF RESPECTIVE SUCCESSIVE CODEWORD SEQUENCES FOR EACH SUCCESSIVE SEQUENCE OF VIDEO FRAMES

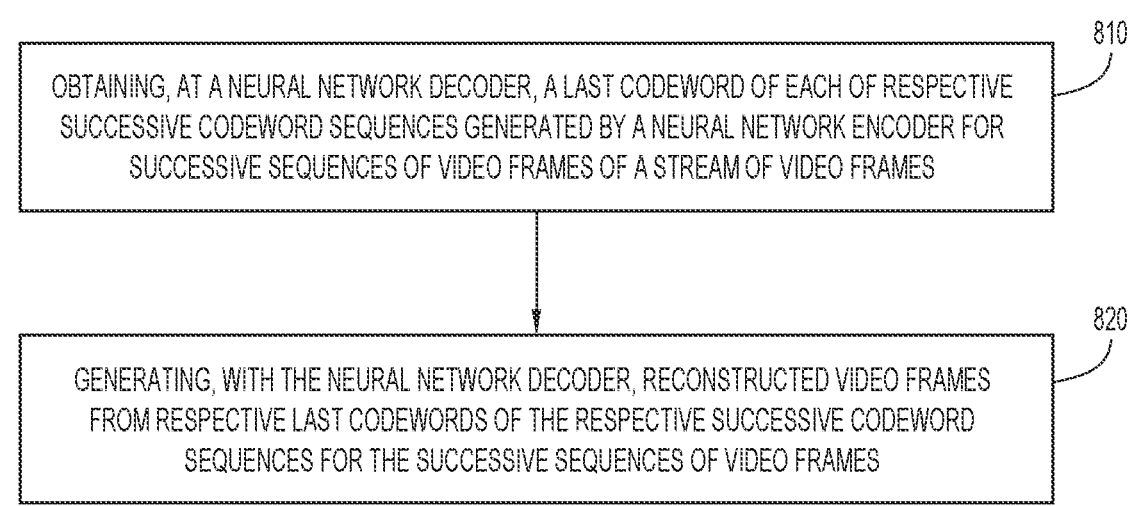

810

OBTAINING, AT A NEURAL NETWORK DECODER, A LAST CODEWORD OF EACH OF RESPECTIVE SUCCESSIVE CODEWORD SEQUENCES GENERATED BY A NEURAL NETWORK ENCODER FOR SUCCESSIVE SEQUENCES OF VIDEO FRAMES OF A STREAM OF VIDEO FRAMES

820

GENERATING, WITH THE NEURAL NETWORK DECODER, RECONSTRUCTED VIDEO FRAMES FROM RESPECTIVE LAST CODEWORDS OF THE RESPECTIVE SUCCESSIVE CODEWORD SEQUENCES FOR THE SUCCESSIVE SEQUENCES OF VIDEO FRAMES

FIG.8

STREAMING NEURAL NETWORK VIDEO CODEC SYSTEM AND METHOD

TECHNICAL FIELD

The present disclosure relates to encoding and decoding video.

BACKGROUND

Video encoding/decoding (codec) is a component in a digital video ecosystem. A codec compresses raw video making it feasible to store and transmit, without drastically compromising the perceived video quality.

Temporal redundancy in video offers significant opportunities for efficient video compression. Many established video codecs employ motion estimation techniques to exploit temporal redundancy. These methods can be computationally intensive and result in error propagation and visual discrepancies.

BRIEF DESCRIPTION OF THE DRAWINGS

FIG. 3 is a diagram depicting a computing arrangement used in a non-streaming video codec.

FIG. 7 is a flow chart depicting techniques to compress video with a neural network encoder that forms a part of a streaming neural network video codec system, according to an example embodiment.

FIG. 8 is a flow chart depicting techniques to generate reconstructed video frames with a neural network decoder that forms a part of a streaming neural network video codec system, according to an example embodiment.

DESCRIPTION OF EXAMPLE EMBODIMENTS

Overview

Figure 1:
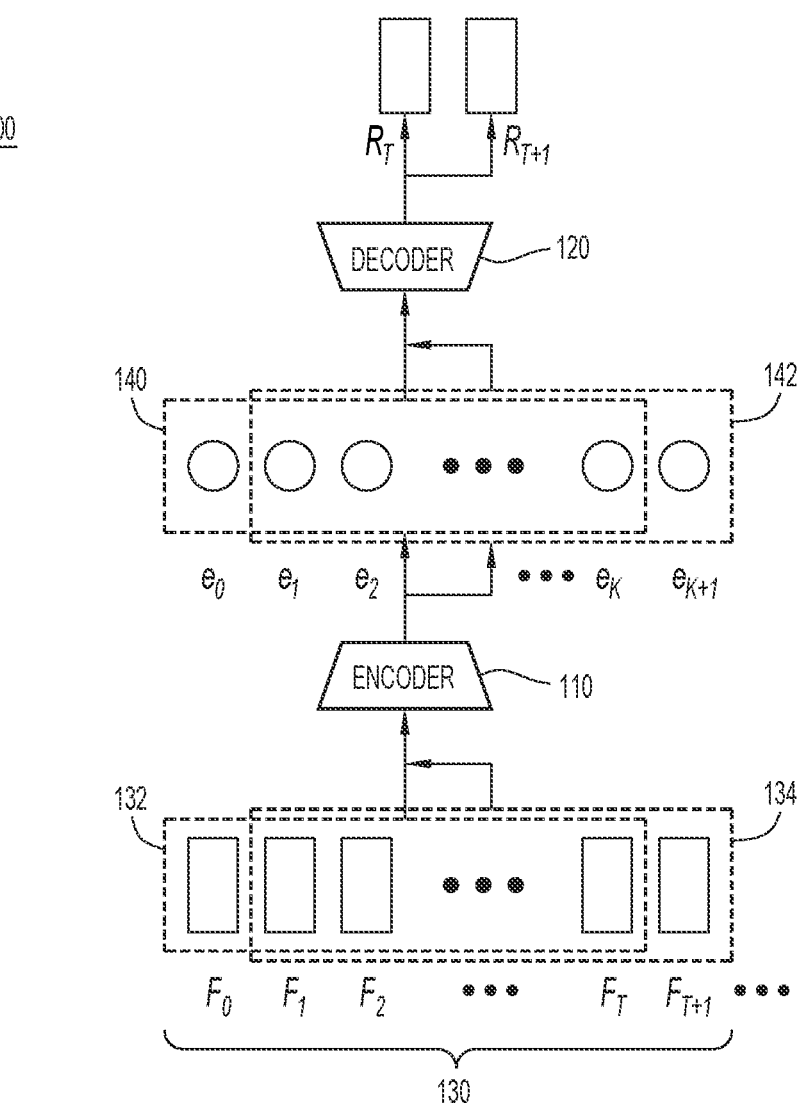
FIG. 1 is a system block diagram of a streaming neural network video codec system according to an example embodiment.

Presented herein are techniques for a streaming video codec. In one form, a method is provided that, from the perspective of an encoder, includes obtaining, from a stream of video frames of video, successive sequences of video frames in a rolling window manner such that there is at least one common video frame between the successive sequences of video frames; compressing each successive sequence of video frames with a neural network encoder to produce a codeword sequence for a last frame of respective successive sequences of video frames such that codewords in the codeword sequence for the successive sequences of video frames are the same except for a last codeword of each respective codeword sequence; and providing to a neural network decoder the last codeword of each of respective successive codeword sequences for each successive sequence of video frames.

Similarly, a method is provided from a perspective of a decoder, of obtaining, a last codeword of each of respective successive codeword sequences generated by a neural network encoder for successive sequences of video frames of a stream of video frames; and generating, with the neural network decoder, reconstructed video frames from respective last codewords of the respective successive codeword sequences for the successive sequences of video frames.

Example Embodiments

Traditional non-learning based video codecs (e.g., H26x video codec standards) utilize techniques including transform coding, quantization, entropy coding, and motion compensation for video compression. These techniques are usually designed with fixed algorithms and structures, which provide limited adaptability to different contents or circumstances. They also prioritize pixel error metrics, such as peak signal-to-noise ratio (PSNR), over perceptual quality. As a result, they introduce visual artifacts that are noticeable and distracting to human viewers.

Neural-based video codecs utilize deep learning techniques, specifically neural networks, to achieve efficient video compression. Over the past few years, neural-based video codecs have garnered significant attention due to several technical advantages. First, neural-based video codecs are data-driven. Training on massive data makes them more adaptable to various content types and different quality degradation. Second, neural-based video codecs can optimize the entire compression-decompression pipeline together, tailoring every step toward optimal system performance. Unlike the non-learning-based approach, the optimization target for neural-based video codecs can be tailored for perceptual quality using advanced loss functions, ensuring the decoded video has better visual quality.

One major challenge for neural codecs is the computational complexity, which can limit the capacity to utilize temporal redundancy. Some existing neural codecs follow a residual framework. One such existing neural codec uses a video compression transformer (VCT) architecture. In a VCT architecture, each input frame is compressed independently using a pre-trained image codec. Then a transformer can learn the current codewords from the codewords of previous frames.

There are major differences between VCT and the streaming neural video codec presented herein. First, in a VCT architecture, the code sequence for the current frame can be predicted from the previous frames. In the streaming neural video codec presented herein, the code sequence of the current frame directly overlaps with the previous frame and therefore there is no need to do code prediction in the same way as VCT. Second, in the VCT architecture, the computation for each frame is independent in the first step and then recurrent in the second step. Neither of these two steps is able to save on computation cost by taking advantage of repeated computations. However, in the streaming video codec presented herein, due to the streaming architecture, most compute operations from the current video frame are the same as for the previous video frame. The computational costs can be therefore further reduced using the streaming video codec presented herein.

A streaming video codec is presented herein that achieves both efficient compression and computational performance with high visual quality. Reference is now made to FIG. 1, which shows a high-level block diagram of a streaming neural-based video codec system 100. The neural-based video codec system 100 includes an encoder 110 and a decoder 120. The encoder 110 receives as input video frames $\{F_0, F_1, \ldots, F_T, F_{T+1}, \ldots\}$ that are part of a video stream to be encoded for transmission or storage, and ultimately to be decoded by the decoder 120.

As an example for purposes of explanation, the video codec system has a field of view denoted by T such that given an input stream 130 of video frames $\{F_0, F_1, \ldots, F_T, F_{T+1}, \ldots\}$, the encoding and decoding process can start from the Tth frame $F_T$, that is after T−1 frames have been received by the encoder 110. The encoder 110 ingests a first sequence of T−1 video frames $\{F_0, F_1, F_T\}$ of the input stream 130 as shown at reference numeral 132, and compresses the last frame $F_T$ into a first codeword sequence 140 of K codewords, denoted as $\{e_0, e_1, \ldots, e_K\}$.

The decoder 120 accepts the first codeword sequence 140 of K codewords $\{e_0, e_1, \ldots, e_K\}$ as its input and reconstructs the Tth input video frame $F_T$ to generate a Tth reconstructed video frame $R_T$.

When the subsequent frame, $F_{T+1}$, of the input stream 130 is introduced at the encoder 110, the input window shifts ahead by a single frame, to input a next sequence 134 of video frames $\{F_1, \ldots, F_T, F_{T+1}\}$. Concurrently, the compressed codeword sequence that the encoder 110 generates is also shifted, generating an additional codeword, $e_{K+1}$. Thus, for the next sequence 134 of video frames, the encoder generates a second codeword sequence 142 of codewords, denoted as $\{e_1, e_2, \ldots, e_{K+1}\}$, which is provided to the decoder 120. The decoder 120 then interprets the second codeword sequence 142 of codewords $\{e_1, e_2, \ldots, e_{K+1}\}$ to generate the reconstructed video frame $R_{T+1}$ for input video frame $F_{T+1}$. This aligns with the fact that consecutive frames of video stream 130 have a lot of information in common. The majority of the codeword sequences for frames $F_T$ and $F_{T+1}$ overlap, represented by $\{e_0, e_1, \ldots, e_K\}$. Therefore, to transmit frame $F_{T+1}$, only the freshly generated codeword $e_{K+1}$ needs to be sent or provided to the decoder 120. The decoder 120 only needs codeword $e_{K+1}$ to generate reconstructed frame $R_{T+1}$ since it already has codewords $\{e_0, e_1, \ldots, e_K\}$ sent for frame $F_T$. For frames ranging from $F_0$ to $F_{T-1}$, where there are not sufficient preceding frames to populate the input window, the initial frame $F_0$ can be replicated as needed.

Thus, after the first codeword sequence 140 is provided to the decoder 120, only the last codeword of the second codeword sequence 142 needs to be provided to the decoder 120 for generating the reconstructed frame $R_{T+1}$. This applies to subsequent sequences of video frames after the second sequence 134 of video frames. Again, due to the sliding window for input of successive video frames, sequences of codewords are generated such that there is overlap in successive sequences of codewords from one sequence of video frames to the next sequence of video frames.

There are several advantages of the above streaming video codec framework. First, to compress an individual frame, the system leverages information from multiple other frames, enhancing the depth of data on the temporal axis, thereby achieving comprehensive encoding. Second, the details to reconstruct a single frame are dispersed across K codewords where (K−1) of those codewords are common with the codewords generated at the previous frame. Therefore, to transmit a single encoded video frame, only 1 of the K codewords needs to be sent. This approach significantly elevates compression efficiency. Third, the inherent streaming capability of both the encoder and decoder ensures a repetition of most processes, leading to a pronounced reduction in the average computation operations needed per frame.

Figure 2A:
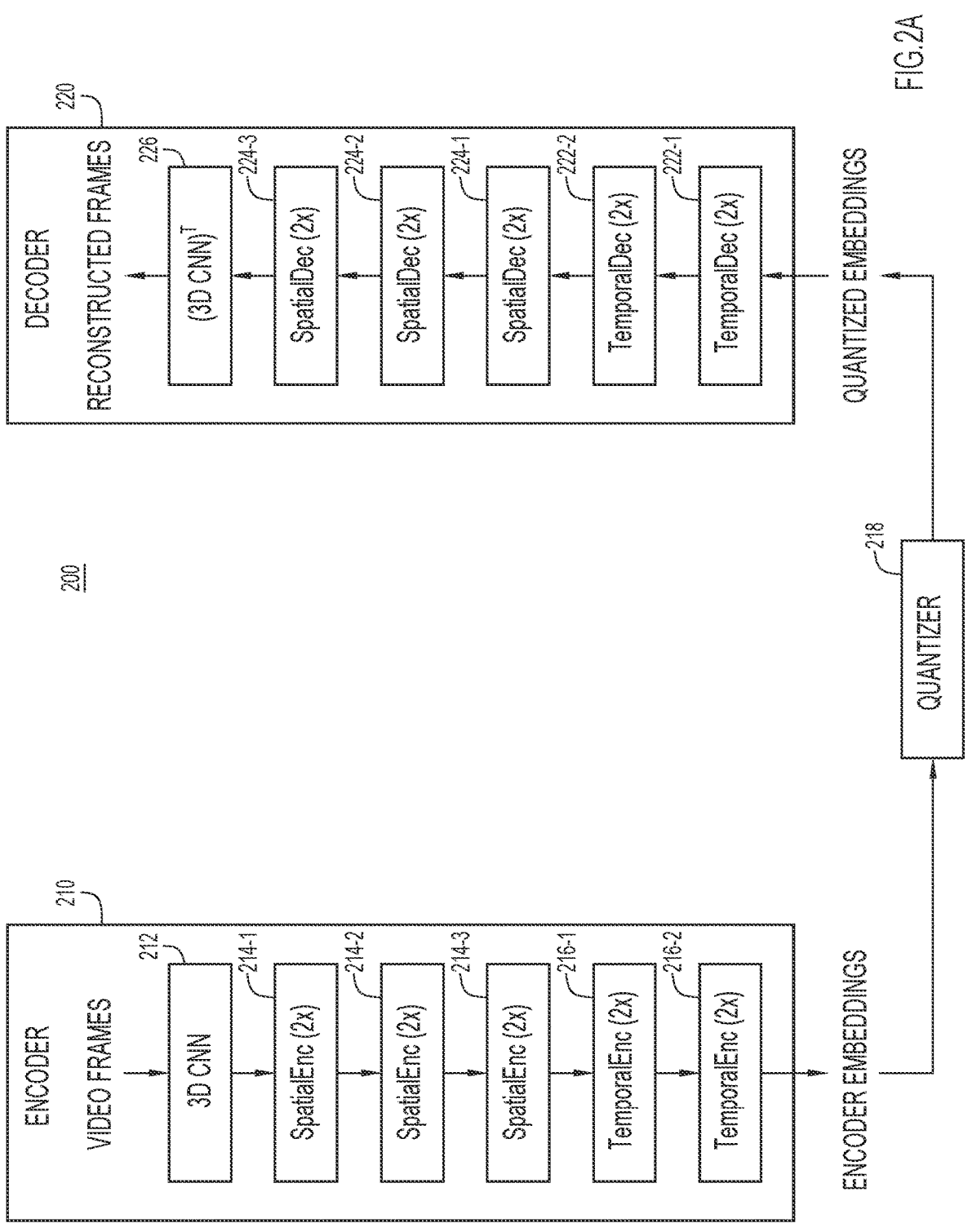
FIG. 2A is a more detailed block diagram of the streaming neural network video codec system comprising a neural network encoder and a neural network decoder, according to an example embodiment.

The encoder 110 and decoder 120 could use any of a variety of implementations. FIGS. 2A-2F illustrate one example implementation. FIG. 2A shows a more detailed block diagram of the functional blocks/modules of a neural-based video codec system 200. The neural-based video codec system 200 comprises an encoder 210 and a decoder 220. The encoder 210 includes a three-dimensional (3D) (time, width, height) convolutional neural network (CNN) 212, spatial encoders (SpatialEnc) 214-1, 214-2 and 214-3, and temporal encoders (TemporalEnc) 216-1 and 216-2. The 3D CNN 212 may be a convolution neural network with kernel size (3,3,3) and output channel 64. The spatial encoders 214-1, 214-2 and 214-3 are three instances of the same spatial encoder block with 2-times (2×) down-sampling on width and height. The temporal encoders 216-1 and 216-2 are two instances of the same temporal encoder block with 2× down-sampling on time. The encoder 210 obtains as input video frames (raw/uncompressed video frames) and generates encoder embeddings that are then quantized by quantizer 218 to generate quantized embeddings that are provided as input to the decoder 220.

The decoder 220 includes temporal decoders (TemporalDec) 222-1 and 222-2, spatial decoders (SpatialDec) 224-1, 224-2 and 224-3, and a transpose 3D CNN 226. The temporal decoders 222-1 and 222-2 are two instances of the same temporal decoder block with 2× up-sampling on time. The spatial decoders 224-1, 224-2 and 224-3 are three instances of the same spatial decoder blocks with 2× up-sampling on width and height.

Figure 2D:
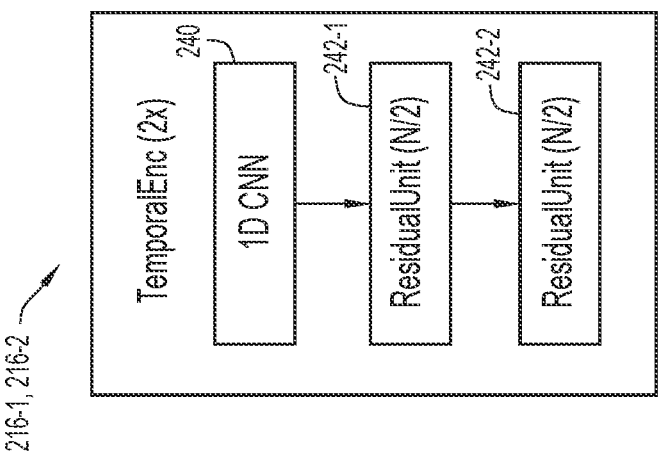
FIG. 2D is a block diagram of a temporal encoder that is included in the neural network encoder of FIG. 2A, according to an example embodiment.
Figure 2C:
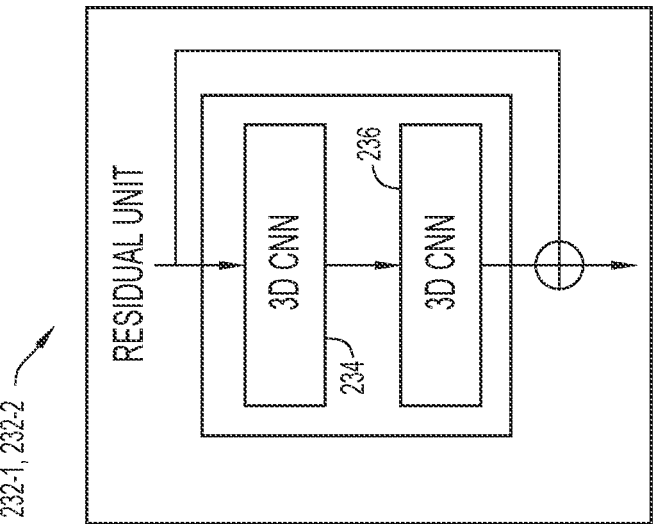
FIG. 2C is a block diagram of a residual unit that forms a part of several functions of the neural network encoder and neural network decoder of FIG. 2A, according to an example embodiment.
Figure 2B:
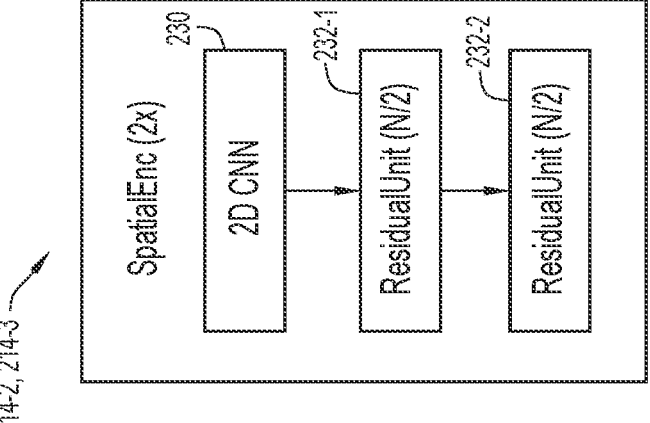
FIG. 2B is a block diagram of a spatial encoder that is included in the neural network encoder of FIG. 2A, according to an example embodiment.

FIG. 2B shows a block diagram of an instance of the spatial encoders 214-1, 214-2 and 214-3. The spatial encoders 214-1, 214-2 and 214-3 each include a 2D (width, height) CNN 230 with kernel size (3,3), stride 2, and two residual units 232-1 and 232-2.

FIG. 2C shows a block diagram of an instance of the residual units 232-1 and 232-2. The residual units 232-1 and 232-2 each includes a first 3D (time, width, height) CNN 234 with kernel size (3,3,3) and output channel N, and a second 3D (time, width, height) CNN 236 with kernel size (1,1,1) and output channel N.

FIG. 2D illustrates a block diagram of an instance of the temporal encoders 216-1 and 216-2. The temporal encoders 216-1 and 216-2 each include a 1D (time) CNN 240 with kernel size (3,3) and stride 2, and two residual units 242-1 and 242-2. The residual units 242-1 and 242-2 may take the form of the residual unit shown in FIG. 2C.

Figure 2F:
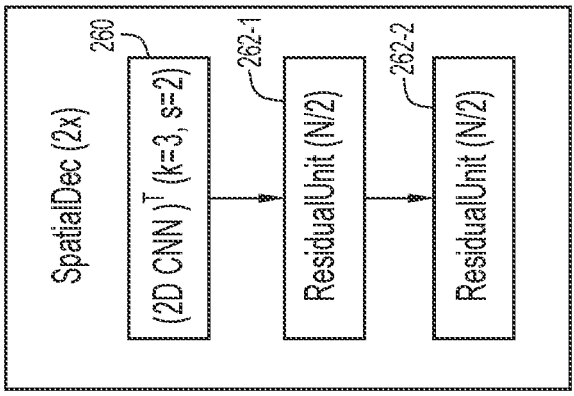
FIG. 2F is a block diagram of a spatial decoder that is included in the neural network decoder of FIG. 2A, according to an example embodiment.
Figure 2E:
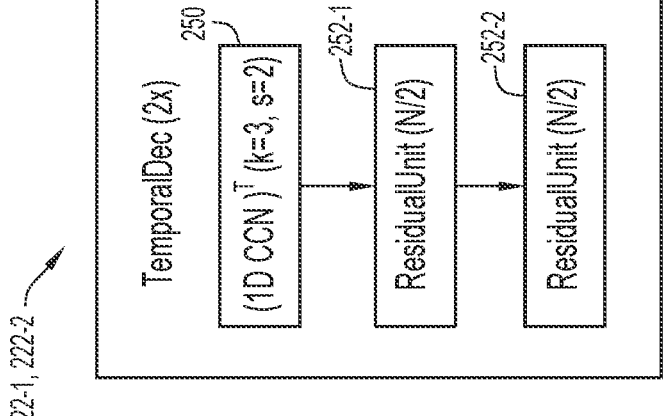
FIG. 2E is a block diagram of a temporal decoder that is included in the neural network decoder of FIG. 2A, according to an example embodiment.

FIG. 2E illustrates a block diagram of an instance of the temporal decoders 222-1 and 222-2. The temporal decoders 222-1 and 222-2 each include a 1D (time) transpose CNN 250 with kernel size (3,3) and stride 2, for example, and 3D residual units 252-1 and 252-2 that may have the same implementation as that shown in FIG. 2C.

FIG. 2F illustrates a block diagram of an instance of the spatial decoders 224-1, 224-2, and 224-3. The spatial decoders 224-1, 224-2, and 224-3 each include a 2D (width, height) transpose CNN 260 with kernel size (3,3) and stride 2, and 3D residual units 262-1 and 262-2 that may have the same implementation as that shown in FIG. 2C.

Figure 4:
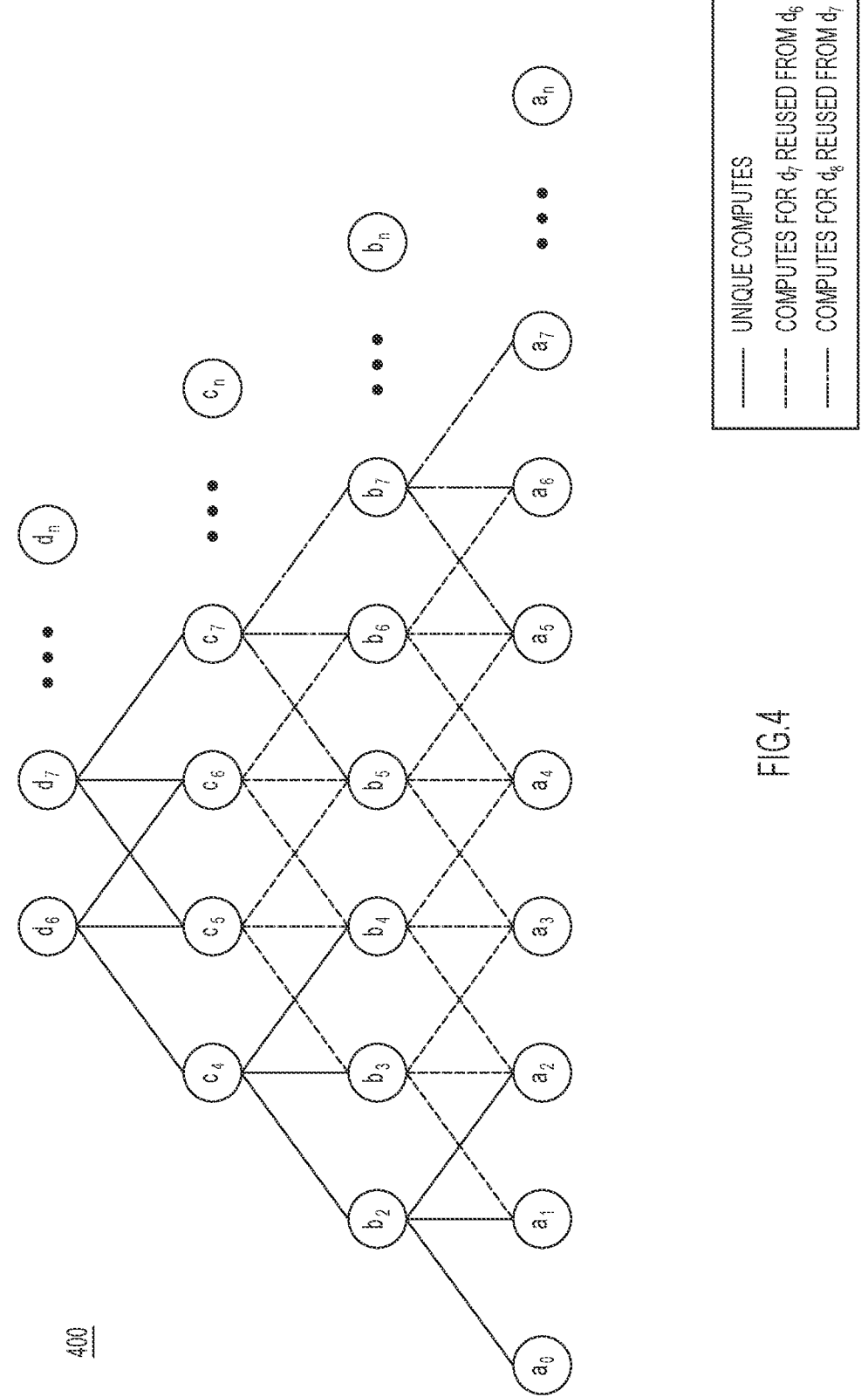
FIG. 4 is a diagram depicting a computing arrangement used by various functions of the streaming neural network video codec system shown in FIG. 2A, according to an example embodiment.

Reference is now made to FIG. 3, which shows an arrangement of compute operations/nodes used for a non-streaming video codec. FIG. 4 shows an arrangement of compute operations/nodes used for a streaming video codec according to the techniques presented herein. The convolutional neural network and transpose convolutional neural networks used in the encoder and decoder shown in FIGS. 2A-2F have the arrangement of compute operations/nodes shown in FIG. 3 or FIG. 4, with the arrangement in FIG. 4 for a streaming video codec having advantages as explained below.

First, in FIG. 3, a compute arrangement 300 of compute operations/nodes is shown in which each window contains K samples (wherein in this example K=7, i.e., $a_0$-$a_6$). In other words, the inputs to the compute arrangement 300 are frames $a_0$-$a_6$. These frames are processed by the compute arrangement consisting of compute nodes $b_0$-$b_6$ and $c_0$-$c_6$ to produce output frames $d_0$-$d_6$. The compute nodes $b_0$-$b_6$ and $c_0$-$c_6$ may be referred to as the "hidden layers" of the compute arrangement 300. The input of K samples is shifted to the next window of input (i.e., $a_7$-$a_{13}$) to produce the next group of outputs $d_7$-$d_{13}$. The compute arrangement 300 is a convolution compute that has some reused compute operations as shown in FIG. 3. However, the compute operations on the left side and right side of the window are not reused, as indicated in the figure. The drawbacks of the compute arrangement 300 are that there is less reuse of compute operations because the compute operations on edge samples of each window are not reusable. In addition, there is a relatively high latency to the compute arrangement because each window has K samples (e.g., K video frames).

Referring now to FIG. 4, a compute arrangement 400 is shown for the neural network components (examples of which are shown in FIGS. 2A-2F) of a streaming video codec according to the techniques presented herein. In this arrangement, a single frame (sample) is computed from the plurality of frames $a_0$-$a_6$ with intermediate compute operations $b_2$-$b_6$ and $c_4$-$c_6$. As can be observed from the figure, the edges are only on one side, the left side, and all subsequent compute operations are reusable. The frame $d_7$ can be computed from frames $a_1$-$a_7$ by reusing previously computed values, and similarly frame $d_7$ can be computed by reusing samples from frame $d_6$. The compute arrangement 400 for a streaming video codec has higher compute reuse than the arrangement shown in FIG. 3 since the compute operations on edge samples only exist on the left side (at the beginning of the sample window). In addition, the compute arrangement 400 has very low latency (0 samples) because frame do can be computed immediately once input frames $a_0$-$a_6$ are obtained. While the streaming video codec concepts presented herein are shown for a one-dimensional input and a convolutional neural network whose hidden layers have a single channel, it is to be understood that the computational advantages are applicable to a multi-dimensional input and for a neural network with multiple channels in the hidden layers.

Figure 5:
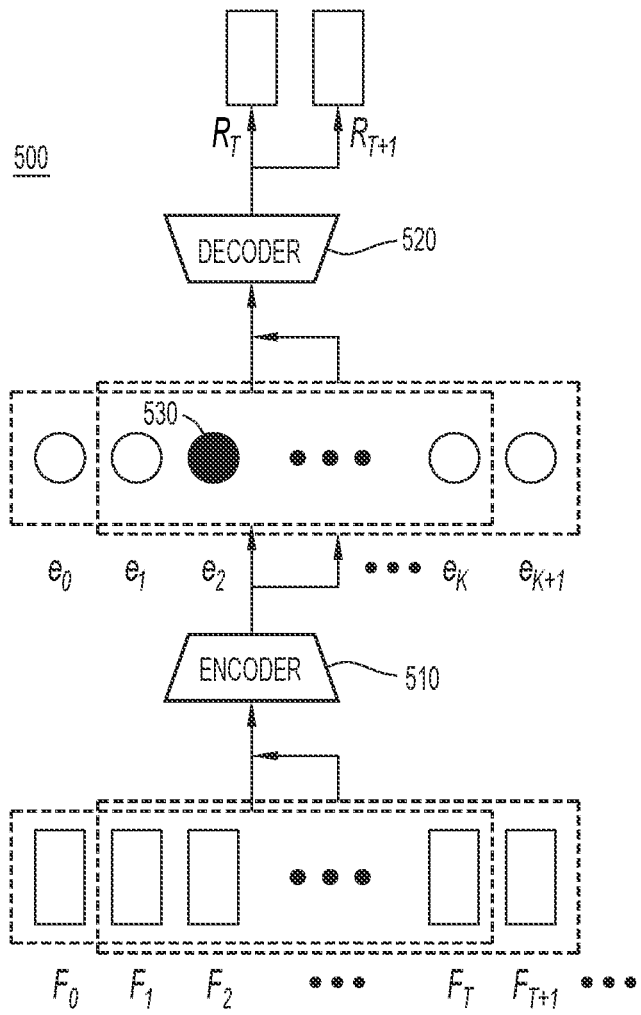
FIG. 5 is a block diagram of the streaming neural network video codec system, similar to FIG. 1, but showing the resiliency of the system to the loss of one or more codewords in a codeword sequence, according to an example embodiment.

Reference is now made to FIG. 5. FIG. 5 illustrates a diagram of a neural-based video codec system 500 that is similar to that shown in FIG. 1, but includes further capabilities, according to an example embodiment. The neural-based video codec system 500 includes an encoder 510 and a decoder 520. By appropriate masking in the training phase of the streaming neural codec, the neural-based video codec system 500 can achieve immunity of the decoder 520 to packet loss. In order to achieve packet loss immunity of the decoder 520, random masks on one or more of the codewords e; are introduced and the decoder 520 is tuned to adapt to one or more lost codewords. For example, as shown at reference numeral 530, the codeword $e_2$ was lost before reaching the decoder 520. However, the decoder 520 can be trained to use the rest of the codewords, e.g., codewords $e_0$, $e_1$, $e_3$, $e_4$, . . . , $e_K$, to generate the correct reconstructed frame $R_T$.

Figure 6:
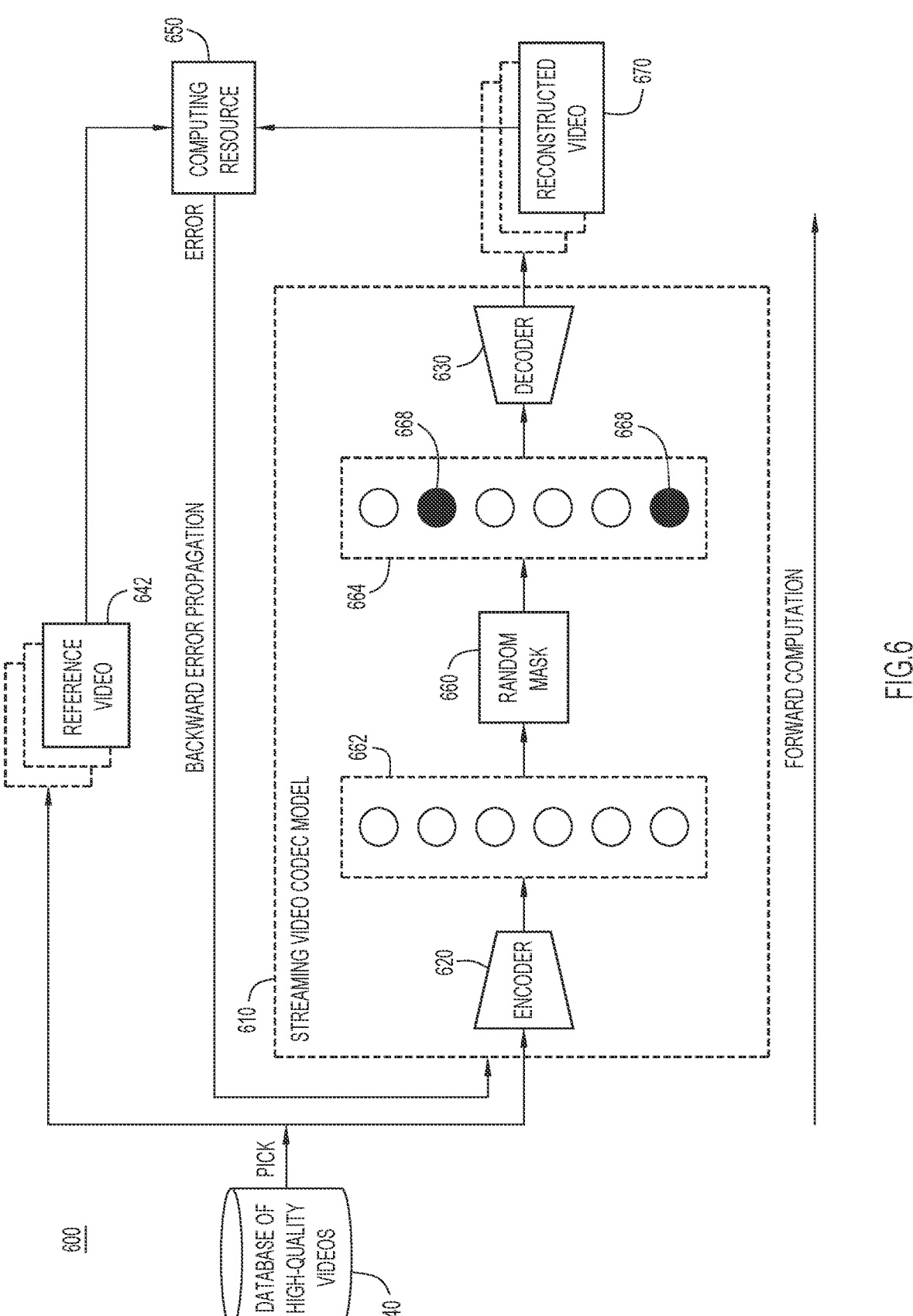
FIG. 6 is a flow diagram depicting techniques to train the neural network video codec system with one or more randomly masked out codewords in a codeword sequence, according to an example embodiment.

Turning now to FIG. 6, a diagram is shown of a system 600 to train a stream video codec model 610 that includes an encoder 620 and a decoder 630 to reconstruct a frame even when one or more codewords of a codeword sequence are lost. The system 600 further includes a database 640 that stores video content for high-quality videos that serve as reference video 642 and a computing resource 650. A random mask operation 660 is provided in the streaming video codec model 610 to randomly mask one or more codewords of a codeword sequence 662 (replacing the one or more codewords with zero's for example) obtained from the encoder 620 prior to input to the decoder 630. Thus, after the codeword sequence 662 passes through the random mask operation 660, a modified codeword sequence 664 is obtained that contains one or more codewords 668 that are masked. The decoder 630 attempts to reconstruct a frame from the modified codeword sequence 664 to some percentage of the original data. Thus, the decoder 630 generates reconstructed video 670.

The computing resource 650 (e.g., a server computer) receives as input the reference video 642 (from the database 640) and the reconstructed video 670 and generates an error representing a difference between the reference video 642 and the reconstructed video 670. The error may be generated on a frame-by-frame basis or across several frames. The computing resource 650 provides the error (as part of a backward propagation flow) to the streaming video codec model 610 to update one or more parameters (e.g., one or more weights in neural network computations shown in FIGS. 2A-2F) of the encoder 620 and decoder 630 to enable the decoder 630 to generate reconstructed video of suitable quality when there is a loss of one or more codewords. The random mask operation 660 can randomly drop or mask out one codeword, two codewords, up to K−1 codewords, and train around that to reconstruct the input video frames.

The operational flow depicted in FIG. 6 is also applicable to how the encoder 620 and decoder 630 may be trained (without masking out one or more codewords). The training process may be the same with the use of a library of reference video frames from which an error is computed with an appropriate loss function. The error is then used to derive adjustments to the weights (and biases) of the computation functions (examples of which are depicted in FIG. 4) of the various neural network blocks of the encoder 620 and decoder 630.

Reference is now made to FIG. 7. FIG. 7 illustrates a flow chart depicting operations of a method 700 performed by a neural network encoder of a streaming neural video codec system according to an example embodiment. The method 700 is directed to operations performed beyond or after a first video frame of a stream of successive video frames; in other words, from a second video frame and onward for the stream of successive video frames. The method 700 includes, at step 710, obtaining, from a stream of video frames of video, successive sequences of video frames in a rolling window manner such that there is at least one common video frame between the successive sequences of video frames. At step 720, the method 700 includes, compressing each successive sequence of video frames with a neural network encoder to produce a codeword sequence for a last frame of respective successive sequences of video frames such that codewords in the codeword sequence for the successive sequences of video frames are the same except for a last codeword of each respective codeword sequence. At step 730, the method 700 includes providing to a neural network decoder, the last codeword of each of respective successive codeword sequences for each successive sequence of video frames. Step 730 may be performed as part of a transmission of compressed video between the neural network encoder and neural network decoder, or after retrieval of compressed video from storage.

The method 700 may further include, generating, with the neural network decoder, reconstructed video frames from respective last codewords of the respective successive codeword sequences for the successive sequences of video frames. As explained above in connection with FIGS. 5 and 6, the neural network encoder and neural network decoder may be trained such that the neural network decoder can generate reconstructed video frames when one or more codewords in respective codeword sequences are lost. The training may involve training the neural network encoder and neural network decoder with one or more codewords randomly masked such that the neural network decoder generates reconstructed video frames from codeword sequences without the one or more codewords in respective codeword sequences. Moreover, the training may involve comparing reconstructed video frames generated by the neural network decoder with the one or more codewords randomly masked out or replaced with all zeros in respective codeword sequences with reference video frames to generate error data, and adjusting one or more weights associated with one or more computations performed by the neural network decoder based on the error data.

As described above in connection with FIG. 1, there is an initial start-up phase where, a first sequence of video frames $\{F_0, F_1, \ldots, F_T\}$ is obtained from a stream of video frames $\{F_0, F_1, \ldots, F_T, F_{T+1}, \ldots\}$. The first sequence of video frames is compressed with the neural network encoder to produce a first codeword sequence $\{e_0, e_1, \ldots, e_K\}$ associated with a last frame $F_T$ in the first sequence of video frames. Therefore, a next sequence of video frames $\{F_1, \ldots, F_T, F_{T+1}\}$ is obtained. The next sequence of video frames is shifted by a single video frame relative to the first sequence of video frames. The next sequence of video frames is compressed with the neural network encoder to produce a next codeword sequence $\{e_1, e_2, \ldots, e_{K+1}\}$ associated with a last frame $F_{T+1}$ in the next sequence of video frames, wherein the next codeword sequence contains the same codewords as the first codeword sequence except for one codeword $e_{K+1}$. For the first sequence of video frames, the first codeword sequence is provided to a neural network decoder, and for the next sequence of video frames, the one codeword is provided to the neural network decoder.

Turning now to FIG. 8, a flow chart is shown that depicts a method 800 performed by a neural network decoder according to the techniques presented herein. The method 800 includes, at step 810, obtaining, at a neural network decoder, a last codeword of each of respective successive codeword sequences generated by a neural network encoder for successive sequences of video frames of a stream of video frames. Next, the method 800 includes, at step 820, generating, with the neural network decoder, reconstructed video frames from respective last codewords of the respective successive codeword sequences for the successive sequences of video frames.

In summary, a streaming neural network video codec is presented herein that leverages temporal redundancy, processing video frames in a rolling window fashion. By encoding video frames using information from multiple frames and only transmitting essential codewords, the system ensures efficient compression with reduced computational overhead. Resiliency to lost codewords is achieved by training with random masks on one or more codewords so that the decoder is robust to packet losses. These techniques achieve improved compression efficiency and significantly reduce the average operations required per frame, allowing for real-time, high-quality video streaming.

Figure 9:
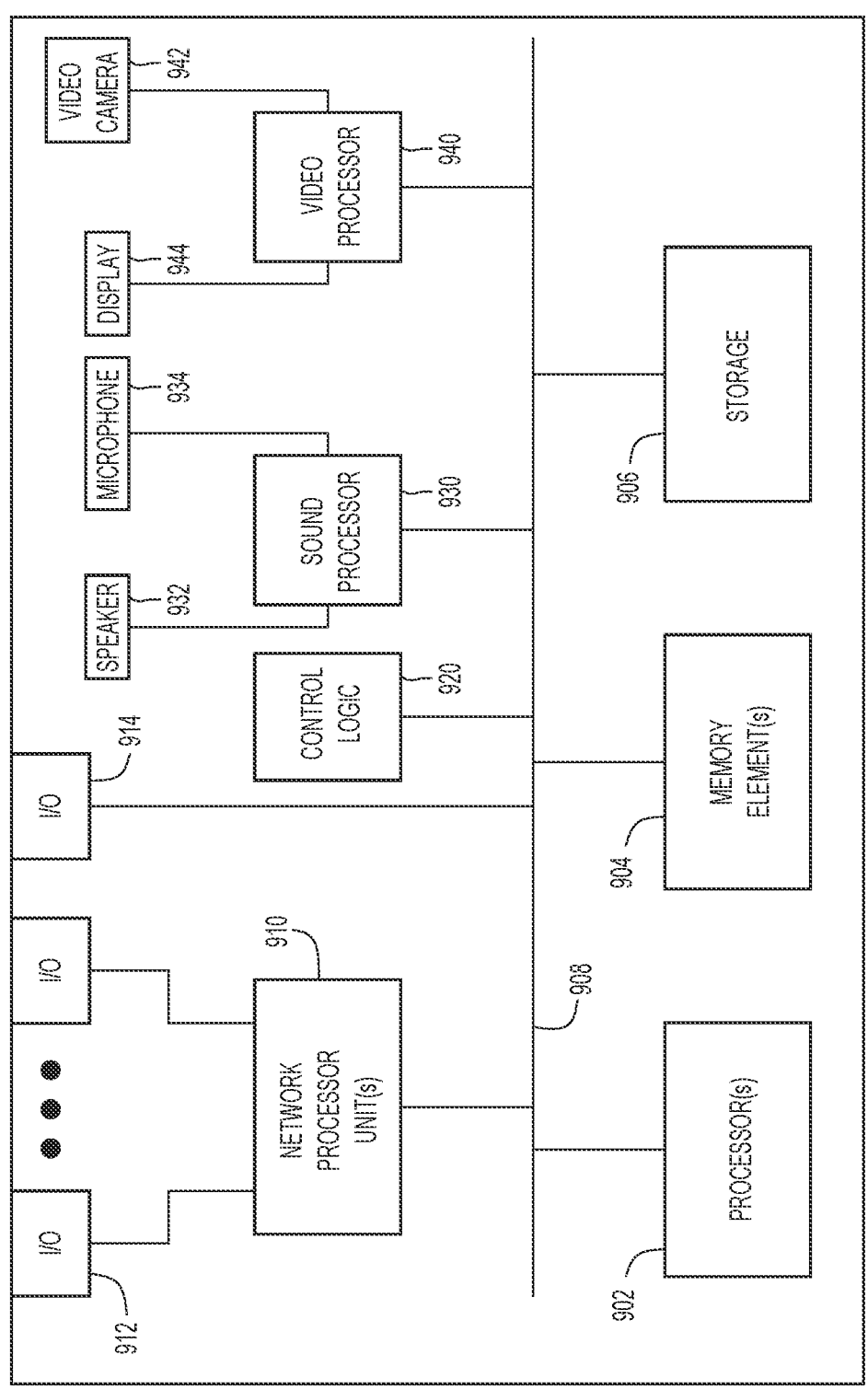
FIG. 9 is a hardware block diagram of a device that may be configured to perform the techniques presented herein, according to an example embodiment.

FIG. 9 is a hardware block diagram of a networking/computing device/apparatus/appliance/endpoint that may perform functions associated with any combination of operations in connection with the techniques depicted in FIGS. 1, 2A-2F, and 3-8. It should be appreciated that FIG. 9 provides only an illustration of one example embodiment and does not imply any limitations with regard to the environments in which different example embodiments may be implemented. Many modifications to the depicted environment may be made.

In at least one embodiment, the device 900 may be any apparatus that may include one or more processor(s) 902, one or more memory element(s) 904, storage 906, a bus 908, one or more network processor unit(s) 910 interconnected with one or more network input/output (I/O) interface(s) 912, one or more I/O interface(s) 914, and control logic 920. In various embodiments, instructions associated with logic for device 900 can overlap in any manner and are not limited to the specific allocation of instructions and/or operations described herein. The I/O interface(s) 914 or the network I/O interfaces 912 may be used to obtain (receive) a stream of video frames to be compressed by the video processor 940 or processor 902 according to the techniques presented herein, when the device 900 is on the encoding side. Similarly, the network I/O interfaces 912 or the I/O interface(s) 914 may be used to obtain (receive) compressed video frames to be decompressed by the video processor 940 or processor 902 according to the techniques presented herein.

In at least one embodiment, processor(s) 902 is/are at least one hardware processor configured to execute various tasks, operations and/or functions for device 900 as described herein according to software and/or instructions configured for device 900. Processor(s) 902 (e.g., a hardware processor) can execute any type of instructions associated with data to achieve the operations detailed herein. In one example, processor(s) 902 can transform an element or an article (e.g., data, information) from one state or thing to another state or thing. Any of the potential processing elements, microprocessors, digital signal processor, baseband signal processor, modem, PHY, controllers, systems, managers, logic, and/or machines described herein can be construed as being encompassed within the broad term 'processor'.

In at least one embodiment, one or more memory element(s) 904 and/or storage 906 is/are configured to store data, information, software, and/or instructions associated with device 900, and/or logic configured for memory element(s) 904 and/or storage 906. For example, any logic described herein (e.g., control logic 920) can, in various embodiments, be stored for device 900 using any combination of memory element(s) 904 and/or storage 906. Note that in some embodiments, storage 906 can be consolidated with one or more memory elements 904 (or vice versa), or can overlap/exist in any other suitable manner. In one or more example embodiments, process data is also stored in the one or more memory elements 904 for later evaluation and/or process optimization.

In at least one embodiment, bus 908 can be configured as an interface that enables one or more elements of device 900 to communicate in order to exchange information and/or data. Bus 908 can be implemented with any architecture designed for passing control, data and/or information between processors, memory elements/storage, peripheral devices, and/or any other hardware and/or software components that may be configured for device 900. In at least one embodiment, bus 908 may be implemented as a fast kernel-hosted interconnect, potentially using shared memory between processes (e.g., logic), which can enable efficient communication paths between the processes.

In various embodiments, network processor unit(s) 910 may enable communication between device 900 and other systems, entities, etc., via network I/O interface(s) 912 (wired and/or wireless) to facilitate operations discussed for various embodiments described herein. In various embodiments, network processor unit(s) 910 can be configured as a combination of hardware and/or software, such as one or more Ethernet driver(s) and/or controller(s) or interface cards, Fibre Channel (e.g., optical) and/or controller(s), wireless driver(s) receivers/transmitters/transceivers, baseband processor(s)/modem(s), and/or other similar network interface driver(s) and/or controller(s) now known or hereafter developed to enable communications between device 900 and other systems, entities, etc. to facilitate operations for various embodiments described herein. In various embodiments, network I/O interface(s) 912 can be configured as one or more Ethernet port(s), Fibre Channel ports, any other I/O port(s), and/or antenna(s)/antenna array(s) now known or hereafter developed. Thus, the network processor unit(s) 910 and/or network I/O interface(s) 912 may include suitable interfaces for receiving, transmitting, and/or otherwise communicating data and/or information in a network environment.

I/O interface(s) 914 allow for input and output of data and/or information with other entities that may be connected to device 900. For example, I/O interface(s) 914 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards.

In various embodiments, control logic 920 can include instructions that, when executed, cause processor(s) 902 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 920) may be identified based upon the application(s) for which they are implemented in a specific embodiment. However, it should be appreciated that any particular program nomenclature herein is used merely for convenience, and thus the embodiments herein should not be limited to use(s) solely described in any specific application(s) identified and/or implied by such nomenclature.

In the event the device 900 is an endpoint (such as telephone, mobile phone, desk phone, conference endpoint, etc.), then the device 900 may further include a sound processor 930, a speaker 932 that plays out audio and a microphone 934 that detects audio. The device 900 further includes a video processor 940, a video camera 942 that captures video and a display 944 that plays out video. The microphone 934 may be included as part of the video camera 942, in some embodiments. The sound processor 930 and video processor 940 may be an accelerator card or other similar processor that may be based on one or more ASICs and associated digital-to-analog and analog-to-digital circuitry to convert signals between the analog domain and digital domain. In some forms, the sound processor 930 and video processor 940 may include one or more digital signal processors (DSPs) and be configured to perform some or all of the operations of the techniques presented herein.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, the storage 906 and/or memory elements(s) 904 can store data, software, code, instructions (e.g., processor instructions), logic, parameters, combinations thereof, and/or the like used for operations described herein. This includes the storage 906 and/or memory elements(s) 904 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In some aspects, the techniques described herein relate to a method including: obtaining, from a stream of video frames of video, successive sequences of video frames in a rolling window manner such that there is at least one common video frame between the successive sequences of video frames; compressing each successive sequence of video frames with a neural network encoder to produce a codeword sequence for a last frame of respective successive sequences of video frames such that codewords in the codeword sequence for the successive sequences of video frames are the same except for a last codeword of each respective codeword sequence; and providing to a neural network decoder the last codeword of each of respective successive codeword sequences for each successive sequence of video frames.

In some aspects, the techniques described herein relate to a method, further including: generating, with the neural network decoder, reconstructed video frames from respective last codewords of the respective successive codeword sequences for the successive sequences of video frames.

In some aspects, the techniques described herein relate to a method, wherein the neural network encoder and neural network decoder are trained such that the neural network decoder can generate reconstructed video frames when one or more codewords in respective codeword sequences are lost.

In some aspects, the techniques described herein relate to a method, further including: training the neural network encoder and the neural network decoder with one or more codewords randomly masked such that the neural network decoder generates reconstructed video frames from codeword sequences without the one or more codewords in respective codeword sequences.

In some aspects, the techniques described herein relate to a method, wherein training includes: comparing reconstructed video frames generated by the neural network decoder with the one or more codewords randomly masked out or replaced with all zeros in respective codeword sequences with reference video frames to generate error data; and adjusting one or more weights associated with one or more computations performed by the neural network decoder based on the error data.

In some aspects, the techniques described herein relate to a method, wherein: obtaining includes obtaining, from the stream of video frames $\{F_0, F_1, \ldots, F_T, F_{T+1}, \ldots\}$, a first sequence of video frames $\{F_0, F_1, \ldots, F_T\}$; and compressing includes compressing the first sequence of video frames with the neural network encoder to produce a first codeword sequence $\{e_0, e_1, \ldots, e_K\}$ associated with a last frame $F_T$ in the first sequence of video frames.

In some aspects, the techniques described herein relate to a method, wherein: obtaining, from the stream of video frames, further includes obtaining a next sequence of video frames $\{F_1, \ldots, F_T, F_{T+1}\}$, wherein the next sequence of video frames is shifted by a single video frame relative to the first sequence of video frames; and compressing includes compressing the next sequence of video frames with the neural network encoder to produce a next codeword sequence $\{e_1, e_2, \ldots, e_{K+1}\}$ associated with a last frame $F_{T+1}$ in the next sequence of video frames, wherein the next codeword sequence contains the same codewords as the first codeword sequence except for one codeword $e_{K+1}$.

In some aspects, the techniques described herein relate to a method, further including: for the first sequence of video frames, providing to a neural network decoder the first codeword sequence; and for the next sequence of video frames, providing to the neural network decoder the one codeword.

In some aspects, the techniques described herein relate to a method including: obtaining, at a neural network decoder, a last codeword of each of respective successive codeword sequences generated by a neural network encoder for successive sequences of video frames of a stream of video frames; and generating, with the neural network decoder, reconstructed video frames from respective last codewords of the respective successive codeword sequences for the successive sequences of video frames.

In some aspects, the techniques described herein relate to a method, wherein the neural network encoder and neural network decoder are trained such that the neural network decoder can generate reconstructed video frames when one or more codewords in respective codeword sequences are lost.

In some aspects, the techniques described herein relate to a method, further including: training the neural network encoder and neural network decoder with one or more codewords randomly masked such that the neural network decoder generates reconstructed video frames from codeword sequences without the one or more codewords in respective codeword sequences.

In some aspects, the techniques described herein relate to a method, wherein training includes: comparing reconstructed video frames generated by the neural network decoder with the one or more codewords randomly masked out or replaced with all zeros in respective codeword sequences with reference video frames to generate error data; and adjusting one or more weights associated with one or more computations performed by the neural network decoder based on the error data.

In some aspects, the techniques described herein relate to a method including: obtaining, from a stream of video frames $\{F_0, F_1, \ldots, F_T, F_{T+1}, \ldots\}$ for video to be encoded, a first sequence of video frames $\{F_0, F_1, \ldots, F_T\}$; compressing the first sequence of video frames with a neural network encoder to produce a first codeword sequence $\{e_0, e_1, \ldots, e_K\}$ associated with a last frame $F_T$ in the first sequence of video frames; obtaining, from the stream of video frames, a next sequence of video frames $\{F_1, \ldots, F_T, F_{T+1}\}$, wherein the next sequence of video frames is shifted by a single video frame relative to the first sequence of video frames; compressing the next sequence of video frames with the neural network encoder to produce a next codeword sequence $\{e_1, e_2, \ldots, e_{K+1}\}$ associated with a last frame $F_{T+1}$ in the next sequence of video frames, wherein the next codeword sequence contains the same codewords as the first codeword sequence except for one codeword $e_{K+1}$; for the first sequence of video frames, providing to a neural network decoder the first codeword sequence; and for the next sequence of video frames, providing to the neural network decoder the one codeword.

In some aspects, the techniques described herein relate to a method, further including: generating, with the neural network decoder, a reconstructed frame Rr from the first codeword sequence; and generating, with the neural network decoder, a reconstructed frame $R_{T+1}$ from the one codeword $e_{K+1}$.

In some aspects, the techniques described herein relate to a method, wherein the neural network encoder and neural network decoder are trained such that the neural network decoder can generate reconstructed video frames when one or more codewords in respective codeword sequences are lost.

In some aspects, the techniques described herein relate to an apparatus including: an input/output interface configured to obtain, from a stream of video frames of video, successive sequences of video frames in a rolling window manner such that there is at least one common video frame between the successive sequences of video frames; and a computer processor configured to compress each successive sequence of video frames with a neural network encoder to produce a codeword sequence for a last frame of respective successive sequences of video frames such that codewords in the codeword sequence for the successive sequences of video frames are the same except for a last codeword of each respective codeword sequence, and to provide to a neural network decoder the last codeword of each of respective successive codeword sequences for each successive sequence of video frames.

In some aspects, the techniques described herein relate to an apparatus, wherein the neural network encoder and neural network decoder are trained such that the neural network decoder can generate reconstructed video frames when one or more codewords in respective codeword sequences are lost.

In some aspects, the techniques described herein relate to an apparatus, wherein the neural network encoder and the neural network decoder are trained with one or more codewords randomly masked such that the neural network decoder generates reconstructed video frames from codeword sequences without the one or more codewords in respective codeword sequences.

In some aspects, the techniques described herein relate to an apparatus, wherein: the input/output interface is configured to obtain, from the stream of video frames $\{F_0, F_1, \ldots, F_T, F_{T+1}, \ldots\}$, a first sequence of video frames $\{F_0, F_1, \ldots, F_T\}$; and the computer processor is configured to compress the first sequence of video frames with the neural network encoder to produce a first codeword sequence $\{e_0, e_1, \ldots, e_K\}$ associated with a last frame $F_T$ in the first sequence of video frames.

In some aspects, the techniques described herein relate to an apparatus, wherein: the input/output interface is configured to obtain, from the stream of video frames, a next sequence of video frames $\{F_1, \ldots, F_T, F_{T+1}\}$, wherein the next sequence of video frames is shifted by a single video frame relative to the first sequence of video frames; and the computer processor is configured to compress the next sequence of video frames with the neural network encoder to produce a next codeword sequence $\{e_1, e_2, \ldots, e_{K+1}\}$ associated with a last frame $F_{T+1}$ in the next sequence of video frames, wherein the next codeword sequence contains the same codewords as the first codeword sequence except for one codeword $e_{K+1}$.

VARIATIONS AND IMPLEMENTATIONS

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may be directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combinations of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further, as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
obtaining, from a stream of video frames of video, successive sequences of video frames in a rolling window manner such that there is at least one common video frame between the successive sequences of video frames;
compressing each successive sequence of video frames with a neural network encoder to produce a codeword sequence for a last frame of respective successive sequences of video frames such that codewords in the codeword sequence for the successive sequences of video frames are the same except for a last codeword of each respective codeword sequence; and
providing to a neural network decoder the last codeword of each of respective successive codeword sequences for each successive sequence of video frames.

2. The method of claim 1, further comprising:
generating, with the neural network decoder, reconstructed video frames from respective last codewords of the respective successive codeword sequences for the successive sequences of video frames.

3. The method of claim 2, wherein the neural network encoder and neural network decoder are trained such that the neural network decoder can generate reconstructed video frames when one or more codewords in respective codeword sequences are lost.

4. The method of claim 3, further comprising:
training the neural network encoder and the neural network decoder with one or more codewords randomly masked such that the neural network decoder generates reconstructed video frames from codeword sequences without the one or more codewords in respective codeword sequences.

5. The method of claim 4, wherein training comprises:
comparing reconstructed video frames generated by the neural network decoder with the one or more codewords randomly masked out or replaced with all zeros in respective codeword sequences with reference video frames to generate error data; and adjusting one or more weights associated with one or more computations performed by the neural network decoder based on the error data.

6. The method of claim 1, wherein:

obtaining comprises obtaining, from the stream of video frames $\{F_0, F_1, \ldots, F_T, F_{T+1}, \ldots\}$, a first sequence of video frames $\{F_0, F_1, \ldots, F_T\}$; and compressing comprises compressing the first sequence of video frames with the neural network encoder to produce a first codeword sequence $\{e_0, e_1, \ldots, e_K\}$ associated with a last frame $F_T$ in the first sequence of video frames.

7. The method of claim 6, wherein:

obtaining, from the stream of video frames, further comprises obtaining a next sequence of video frames $\{F_1, \ldots, F_T, F_{T+1}\}$, wherein the next sequence of video frames is shifted by a single video frame relative to the first sequence of video frames; and compressing comprises compressing the next sequence of video frames with the neural network encoder to produce a next codeword sequence $\{e_1, e_2, \ldots, e_{K+1}\}$ associated with a last frame $F_{T+1}$ in the next sequence of video frames, wherein the next codeword sequence contains the same codewords as the first codeword sequence except for one codeword $e_{K+1}$.

8. The method of claim 7, further comprising:

for the first sequence of video frames, providing to a neural network decoder the first codeword sequence; and for the next sequence of video frames, providing to the neural network decoder the one codeword.

9. A method comprising:

obtaining, at a neural network decoder, a last codeword of each of respective successive codeword sequences generated by a neural network encoder for successive sequences of video frames of a stream of video frames, each of the successive sequences of video frames having been compressed to produce a codeword sequence for a last frame of respective successive sequences of video frames such that codewords in the codeword sequence for the successive sequences of video frames are the same except for a last codeword of each respective codeword sequence; and generating, with the neural network decoder, reconstructed video frames from respective last codewords of the respective successive codeword sequences for the successive sequences of video frames.

10. The method of claim 9, wherein the neural network encoder and neural network decoder are trained such that the neural network decoder can generate reconstructed video frames when one or more codewords in respective codeword sequences are lost.

11. The method of claim 10, further comprising:

training the neural network encoder and neural network decoder with one or more codewords randomly masked such that the neural network decoder generates reconstructed video frames from codeword sequences without the one or more codewords in respective codeword sequences.

12. The method of claim 11, wherein training comprises:

comparing reconstructed video frames generated by the neural network decoder with the one or more codewords randomly masked out or replaced with all zeros in respective codeword sequences with reference video frames to generate error data; and adjusting one or more weights associated with one or more computations performed by the neural network decoder based on the error data.

13. A method comprising:

obtaining, from a stream of a video frames $\{F_0, F_1, \ldots, F_T, F_{T+1}, \ldots\}$ for video to be encoded, a first sequence of video frames $\{F_0, F_1, \ldots, F_T\}$;

compressing the first sequence of video frames with a neural network encoder to produce a first codeword sequence $\{e_0, e_1, \ldots, e_K\}$ associated with a last frame $F_T$ in the first sequence of video frames;

obtaining, from the stream of video frames, a next sequence of video frames $\{F_1, \ldots, F_T, F_{T+1}\}$, wherein the next sequence of video frames is shifted by a single video frame relative to the first sequence of video frames;

compressing the next sequence of video frames with the neural network encoder to produce a next codeword sequence $\{e_1, e_2, \ldots, e_{K+1}\}$ associated with a last frame $F_{T+1}$ in the next sequence of video frames, wherein the next codeword sequence contains the same codewords as the first codeword sequence except for one codeword $e_{K+1}$;

for the first sequence of video frames, providing to a neural network decoder the first codeword sequence; and for the next sequence of video frames, providing to the neural network decoder the one codeword.

14. The method of claim 13, further comprising:

generating, with the neural network decoder, a reconstructed frame Rr from the first codeword sequence; and generating, with the neural network decoder, a reconstructed frame $R_{T+1}$ from the one codeword $e_{K+1}$.

15. The method of claim 13, wherein the neural network encoder and neural network decoder are trained such that the neural network decoder can generate reconstructed video frames when one or more codewords in respective codeword sequences are lost.

16. An apparatus comprising:

an input/output interface configured to obtain, from a stream of video frames of video, successive sequences of video frames in a rolling window manner such that there is at least one common video frame between the successive sequences of video frames; and a computer processor configured to compress each successive sequence of video frames with a neural network encoder to produce a codeword sequence for a last frame of respective successive sequences of video frames such that codewords in the codeword sequence for the successive sequences of video frames are the same except for a last codeword of each respective codeword sequence, and to provide to a neural network decoder the last codeword of each of respective successive codeword sequences for each successive sequence of video frames.

17. The apparatus of claim 16, wherein the neural network encoder and neural network decoder are trained such that the neural network decoder can generate reconstructed video frames when one or more codewords in respective codeword sequences are lost.

18. The apparatus of claim 17, wherein the neural network encoder and the neural network decoder are trained with one or more codewords randomly masked such that the neural network decoder generates reconstructed video frames from codeword sequences without the one or more codewords in respective codeword sequences.

19. The apparatus of claim 16, wherein:

the input/output interface is configured to obtain, from the stream of video frames $\{F_0, F_1, \ldots, F_T, F_{T+1}, \ldots\}$, a first sequence of video frames $\{F_0, F_1, \ldots, F_T\}$; and the computer processor is configured to compress the first sequence of video frames with the neural network encoder to produce a first codeword sequence $\{e_0, e_1, \ldots, e_K\}$ associated with a last frame $F_T$ in the first sequence of video frames.

20. The apparatus of claim 19, wherein:

the input/output interface is configured to obtain, from the stream of video frames, a next sequence of video frames $\{F_1, \ldots, F_T, F_{T+1}\}$, wherein the next sequence of video frames is shifted by a single video frame relative to the first sequence of video frames; and the computer processor is configured to compress the next sequence of video frames with the neural network encoder to produce a next codeword sequence $\{e_1, e_2, \ldots, e_{K+1}\}$ associated with a last frame $F_{T+1}$ in the next sequence of video frames, wherein the next codeword sequence contains the same codewords as the first codeword sequence except for one codeword $e_{K+1}$.

* * * * *